US008843596B2

(12) United States Patent
Goel et al.

(10) Patent No.: US 8,843,596 B2
(45) Date of Patent: Sep. 23, 2014

(54) CONVERSION BETWEEN STREAMING MEDIA COMMUNICATION PROTOCOLS

(75) Inventors: Nitin Goel, Ghaziabad (IN); Puneet Ahuja, Haryana (IN)

(73) Assignee: Adobe Systems Incorporated, San Jose, CA (US)

( * ) Notice: Subject to any disclaimer, the term of this patent is extended or adjusted under 35 U.S.C. 154(b) by 178 days.

(21) Appl. No.: 13/307,491

(22) Filed: Nov. 30, 2011

(65) Prior Publication Data

US 2013/0198335 A1    Aug. 1, 2013

(51) Int. Cl.
G06F 15/16 (2006.01)

(52) U.S. Cl.
USPC ........... 709/219; 709/202; 709/217; 709/231; 709/E17.009

(58) Field of Classification Search
CPC .................................................... H04L 65/608
USPC .................. 709/202–203, 217–219, 231; 707/E17.009–E17.01, 758, 769, 780, 707/821, 825; 726/27, 30
See application file for complete search history.

(56) References Cited

U.S. PATENT DOCUMENTS

| 7,373,415 | B1 * | 5/2008 | DeShan et al. ................ 709/231 |
| 7,934,010 | B2 * | 4/2011 | Foster et al. .................. 709/231 |
| 2009/0282076 | A1 * | 11/2009 | Werstiuk et al. ...... 707/E17.009 |
| 2010/0030908 | A1 * | 2/2010 | Courtemanche et al. ..... 709/231 |
| 2010/0180011 | A1 * | 7/2010 | Sood et al. .................... 709/219 |
| 2010/0257203 | A1 * | 10/2010 | Sun ........................ 707/E17.009 |
| 2011/0016198 | A1 * | 1/2011 | Shishido et al. .............. 709/219 |
| 2012/0137015 | A1 * | 5/2012 | Sun ................................ 709/231 |
| 2013/0007298 | A1 * | 1/2013 | Ramaswamy et al. ........ 709/231 |
| 2013/0031216 | A1 * | 1/2013 | Willis et al. ................... 709/219 |
| 2013/0174271 | A1 * | 7/2013 | Handal et al. .................. 726/27 |
| 2014/0075582 | A1 * | 3/2014 | Hierro et al. ................... 726/30 |

OTHER PUBLICATIONS

HTTP Dynamic Streaming on the Adobe Flash Platform, Adobe Flash Platform Technical White Paper, 2010, 18 pages.
HTP Live Streaming Overview, Networking and Internet, Apr. 1, 2011, 38 pages.
Pantos, et al., HTTP Live Streaming, draft-pantos-http-live-streaming-06, Mar. 31, 2011, 24 pages.

* cited by examiner

*Primary Examiner* — Bharat N Barot
(74) *Attorney, Agent, or Firm* — Kilpatrick Townsend & Stockton LLP

(57) ABSTRACT

In response to receiving a request from a client device, a determination may be made that the request corresponds to an HLS playlist related to a media asset. Information regarding a time segment for the media asset may be determined based on at least one HDS file corresponding with the media asset. An HLS playlist may be generated based at least in part on the determined information. The HLS playlist may be sent to the client device. In response to receiving a request from a client device, a determination may be made that the request corresponds to an HLS media segment of a media asset. At least one HDS media file corresponding to the HLS media segment may be determined. At least a portion of the determined HDS media file(s) may be converted into an HLS media segment. The HLS media segment may be sent to the client device.

25 Claims, 6 Drawing Sheets

CONVERSION BETWEEN STREAMING MEDIA COMMUNICATION PROTOCOLS

FIELD OF THE INVENTION

This disclosure relates generally to streaming media and more particularly relates to dynamically converting one type of streaming media into another type of streaming media.

BACKGROUND

There are various protocols available to stream media content to compatible devices. One such protocol is HTTP Live Streaming (HLS). HLS is a hypertext transfer protocol (HTTP) based media streaming communications protocol implemented by Apple Inc. HLS allows audio and video to be sent over HTTP from a web server for playback on compatible devices. Examples of compatible devices include, but are not limited to, iOS-compatible devices—such as an iPhone® or iPod touch®—and MAC OS X-compatible devices. HLS supports the streaming of live broadcasts as well as prerecorded media content. With HLS, the same content may be streamed at multiple bit rates to support various connection speeds. Thus, as network bandwidth changes, software such as a web browser executing on an HLS-compatible device may be able to switch from a stream having one bit rate to a more suitable stream having a different bit rate for the content.

Another protocol to stream media content to compatible devices is HTTP Dynamic Streaming (HDS). HDS is an HTTP-based media streaming communications protocol implemented by Adobe Systems Incorporated. HDS allows audio or video, or both, to be sent over HTTP from a web server for playback on compatible devices. Examples of compatible devices include, but are not limited to, desktop computers, laptops, mobile phones, personal digital assistants (PDAs), and other devices supporting Adobe® Flash® Player. HDS supports live and on-demand media content that can adjust to viewer connection speed and processing power using standard HTTP protocol infrastructures. With HDS, the same content may be streamed at multiple bit rates to support various connection speeds. There is a need for efficient and scalable technologies that allow media content to be simultaneously streamed over HLS and HDS. Systems and methods that address at least some of these needs are disclosed herein.

SUMMARY

One exemplary embodiment involves receiving, by a processor, a request from a client device. In this embodiment and in response to receiving the request, the processor determines that a playlist needs to be generated based at least in part on the request. The processor may determine a first format for the playlist based at least in part on the request. In one embodiment, the processor determines a media asset based at least in part on the request. The processor can determine information related to the media asset by accessing at least one file in a second format where the second format is different than the first format. In one embodiment, the processor generates the playlist in the first format. The generated playlist may contain at least one Uniform Resource Identifier (URI) usable by the processor or the client device, or both, to identify a media segment corresponding to a time segment of the media asset. The generated playlist may be sent to the client device.

Another embodiment involves receiving a request from a client device where the request includes a URI. In this embodiment and in response to receiving the request, the processor determines that a media conversion is needed based at least in part on the URI. The processor may determine a conversion format based at least in part on the URI. In one embodiment, a media asset is determined based at least in part on the URI. The processor may determine at least a portion of at least one media file related to the media asset to convert into the conversion format where each determined media file has a different format than the conversion format. In one embodiment, the determined media file or media files are converted into at least one media file in the conversion format. At least one converted media file in the conversion format can be sent to the client device.

These illustrative features are mentioned not to limit or define the disclosure, but to provide examples to aid understanding thereof. Additional embodiments are discussed in the Detailed Description, and further description is provided there. Advantages offered by one or more of the embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Systems and methods disclosed herein relate generally to streaming media and more particularly relates to dynamically converting one type of streaming media into another type of streaming media. For example, in an embodiment, an HTTP Live Stream (HLS) can be dynamically constructed from an HTTP Dynamic Stream (HDS).

Figure 1:
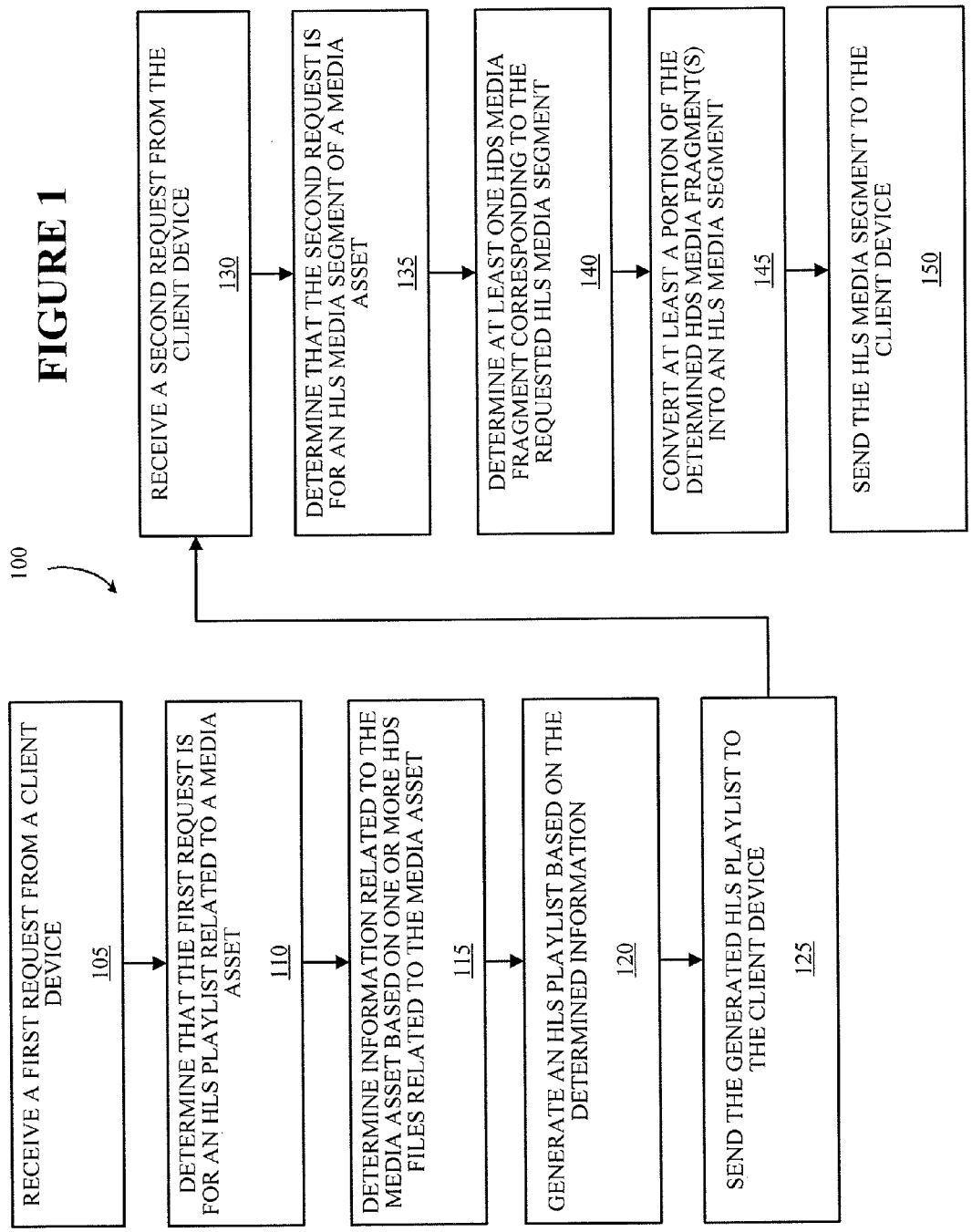
FIG. 1 is a flow chart illustrating a method of receiving and responding to a request for an HLS playlist and an HLS media segment according to an embodiment.

In one embodiment, a server dynamically generates a playlist in response to a request received from a client device. For example, a portion of the method 100 shown in FIG. 1 is directed to a method of receiving and responding to a request for an HLS playlist according to an embodiment. The method 100 begins in block 105 when a first request is received by a server from a client device. For example, a server may receive an hypertext transfer protocol (HTTP) request from a tablet computer over the Internet.

After receiving the first request 105, the server determines that the first request is for an HLS playlist related to a media asset 110. A media asset may be a video, television show, movie clip, live video broadcast, live audio broadcast, live video and audio broadcast, or other media content. For example, a server may receive a request over HTTP from a mobile phone. In this embodiment, the request includes a Uniform Resource Identifier (URI) which the server analyzes to determine that the request is for an HLS playlist related to a media asset. For example, a URI included in a request may include "myVideo.m3u8". In this embodiment, the server may parse or otherwise analyze the URI to determine that the request is for an HLS playlist based on the .m3u8 file extension specified in the URI and the server may determine the requested HLS playlist is related to a media asset entitled "myVideo" based on a filename specified in the URI.

After the server determines that the first request from the client device is for an HLS playlist related to a media asset 110, the server determines information related to the media asset based on one or more HDS files related to the media asset 115. For example, if the server determines that the first request is related to a media asset entitled "myVideo", then the server may determine information related to "myVideo" based on one or more HDS files related to "myVideo". In one embodiment, the server accesses one or more HDS bootstrap files related to the media asset to determine information related to the media asset. In another embodiment, the server accesses one or more files containing references to one or more files containing bootstrap information related to the media asset. In other embodiments, the server accesses one or more files containing bootstrap information related to the media asset to determine information related to the media asset. Bootstrap information may include information such as duration, start time, end time, total time, current time, etc. related to a media asset, one or more HDS media segments related to the media asset, one or more HDS media fragments related to the media asset, or a combination thereof. For example, if the determined media asset is entitled "myVideo", then the server may access an HDS bootstrap file related to "myVideo" to determine that "myVideo" starts at time zero (i.e. at the beginning of the video) and has a duration of sixty seconds.

In another embodiment, the media asset may be associated with a live event. In this embodiment, as the live event takes place, one or more HDS media segments or HDS media fragments, or both, associated with the media asset may be added. For example, a media asset may be associated with a number of HDS media segments or HDS media fragments, or both, five minutes into a live event. In this embodiment, the media asset may be associated with a larger number of HDS media segments or HDS media fragments, or both, ten minutes into the live event than was associated with the media asset five minutes into the live event. Thus, the current time or the total duration, or both, for the media asset may change as the live event takes place. In addition, the current total time of a media asset may be updated as a live event progresses. Furthermore, one or more HDS bootstrap files or one or more HDS indexes, or both, may be updated to reflect the increased number of HDS media segments or HDS media fragments, or both.

After determining information related to the media asset based on one or more HDS files related to the media asset 115, the server generates the HLS playlist based on the determined information 120. In one embodiment, the HLS playlist is generated based on a determined start time and total time for the media asset. In another embodiment, the HLS playlist is generated based on a determined start time and current time for the media asset. The HLS playlist may contain information identifying one or more HLS media segments. For example, if the determined media asset is entitled "myVideo" and it is determined that the media asset starts at time zero and has a total length of sixty seconds, then the generated HLS playlist may include six URIs with each URI identifying ten seconds of the media asset entitled "myVideo". Thus, in this embodiment, one URI in the generated HLS playlist corresponds with seconds 0 to 10 of "myVideo", another URI in the generated HLS playlist corresponds with seconds 11 to 20 of "myVideo", another URI in the generated HLS playlist corresponds with seconds 21 to 30 of "myVideo", etc. The generated HLS playlist may include information that identifies that the media segments are related to HLS media segments for the media asset. For example, each URI in the generated HLS playlist may include a file extension of .ts which the server can interpret as being related to an HLS media segment.

In one embodiment, the server may use a naming scheme for the information identifying one or more HLS media segments in the generated HLS playlist. For example, the server may use a naming scheme for URIs contained in the generated playlist. In one embodiment, the generated playlist contains URIs corresponding to HLS media segments according to the following scheme: "fileNameNumX.ts". In this embodiment the "fileName" portion refers to the media asset, "NumX" refers to a sequence number, and ".ts" refers to a file extension indicating that the URI is related to an HLS media segment. The HLS playlist generated by the server may also include information indicating that each of the URIs in the playlist correspond to an HLS media segment having an equal, specified duration. For example, the HLS playlist may contain "#EXT-X-TARGETDURATION:10" which indicates that each of the URIs correspond with a media segment having a duration of 10 seconds. Thus, in the example discussed above regarding "myVideo", the generated HLS playlist may contain six URIs. In this embodiment, one URI in the generated playlist includes "myVideo0.ts" corresponding with seconds 0 to 10 of "myVideo", another URI in the generated playlist includes "myVideo.ts" corresponding with seconds 10 to 20 of "myVideo", another URI in the generated playlist includes "myVideo2.ts" corresponding with seconds 20 to 30 of "myVideo", etc.

One or more URIs in the generated HLS playlist may correspond with a filename that does not exist on the server. For example, a URI in a generated HLS playlist may contain "myVideo1.ts". In this embodiment, the file "myVideo1.ts" may not actually exist on the server. For example, the file "myVideo1.ts" may not be stored on a hard drive associated with the server. In another embodiment, the file "myVideo1.ts" may not be stored in memory or cache, or both, associated with the server. In some embodiments, the server may not contain any HLS-related files for a media asset. In this embodiment, the server may generate the HLS playlist based on other media files, such as HDS-related files, for the media asset.

After generating the HLS playlist based on the determined information 120, the server sends the generated HLS playlist to the client device that made the first request 125. For example, the server may send the generated HLS playlist to a tablet computer over HTTP if the tablet computer sent the first request to the server.

In one embodiment, a server dynamically converts one or more HDS-related media files into an HLS media segment. For example, referring back to FIG. 1, a portion of the method 100 shown in FIG. 1 is directed to a method of receiving and responding to a request for an HLS media segment according to an embodiment. In block 130, a second request is received by a server from a client device. For example, a server may receive an HTTP request from a mobile phone over a wireless network.

After receiving the second request 130, the server determines that the second request is for an HLS media segment related to a media asset 135. For example, a server may receive a second request over HTTP from a desktop computer. In this embodiment, the second request includes a URI which the server analyzes to determine that the second request is for an HLS media segment of a media asset. In one embodiment, a URI may use a naming scheme to identify one or more HLS media segments.

The naming scheme of a URI in a second request may follow the naming scheme used by the server to generate the HLS playlist. For example, a URI contained in the second request may correspond to an HLS media segment according to the following scheme: "fileNameNumX.ts". In this embodiment the "fileName" portion refers to the media asset, "NumX" refers to a sequence number, and ".ts" refers to a file extension indicating that the URI is related to an HLS media segment. In one embodiment, the URI contains additional information that indicates a duration for the HLS media segment. In another embodiment, the server determines the duration of the media segment. For example, the server may determine that an HLS media segment has a duration of 10 seconds. In this embodiment, if the server receives a second request containing a URI including "myVideo2.ts", then the server may determine that the second request is for an HLS media segment of a media asset. For example, the server may determine based on the .ts in the URI that the request is for an HLS media segment of a media asset entitled "myVideo". Furthermore, the server may determine that the requested HLS media segment corresponds to seconds 20 to 30 of "myVideo" because "2" in the URI indicates a start time of 20 seconds (i.e., 2*10 second HLS media segment duration) and an ending time of 30 seconds based on the duration of the HLS media segment (i.e. 10 seconds).

In an embodiment, a URI included in the second request from the client device with a filename that does not exist on the server. For example, a URI in a second request may contain the text "myVideo1.ts". In this embodiment, the file "myVideo1.ts" may not actually exist on the server. For example, the file "myVideo1.ts" may not be stored on a hard drive associated with the server. In another embodiment, the file "myVideo1.ts" may not be stored in memory or cache, or both, associated with the server. In some embodiments, the server may not contain any HLS-related files for a media asset. In an embodiment, the server may convert one or more media files related to the media asset into an HLS-compatible format.

Once the server has determined that the second request is for an HLS media segment of a media asset 135, the server determines at least a portion of at least one HDS media fragment corresponding to the request HLS media segment 140. For example, if the server determines that the second request is for an HLS media segment corresponding with seconds 20 to 30 of a media asset entitled "myVideo", then the server may determine at least a portion of one or more HDS media fragments related to seconds 20 to 30 of "myVideo". In doing so, the server may access one or more HDS bootstrap files or one or more HDS indexes, or both, related to the determined media asset. For example, in one embodiment, HDS bootstrap information related to the determined media asset indicates that there are two HDS media segments corresponding with second 20 to 30 of "myVideo". In one embodiment, the server may access one or more HDS index files related to "myVideo" and determine that there are five HDS media fragments corresponding with seconds 20 to 30 of "myVideo". One or more HDS index files may contain information that enables a server to obtain or identify, or both, one or more HDS media segments or one or more HDS media fragments, or both.

Once at least a portion of at least one HDS media fragment corresponding to the request HLS media segment has been determined by the server 140, then the server converts at least a portion of the one of the determined HDS media fragments related to the HDS media asset into an HLS media segment 145. For example, if the server determines that there are five HDS media fragments corresponding with a requested HLS media segment of a media asset, then the server may convert at least a portion of the five HDS media fragments into an HLS media segment. In this embodiment, the five determined HDS media fragments may be related to a single HDS media segment. In another embodiment, two of the determined HDS media fragments are related to one HDS media segment containing four HDS media fragments and three of the determined HDS media fragments are related to another HDS media segment containing four HDS media fragments. In one embodiment, a portion of one or more HDS media fragments may be converted into an HLS media segment. In an embodiment, the converted HLS media segment has a MPEG-2 TS format. In one embodiment, the conversion is performed after receiving a request. For example, the conversion may be performed on-the-fly or substantially in real-time. In some embodiments, the conversion is performed in response to receiving the second request from the client device.

After converting at least a portion of at least one HDS media fragment into an HLS media segment 145, the server sends the HLS media segment to the client device that made the second request 150. For example, the server may send the HLS media segment to a tablet computer over HTTP if the tablet computer sent the second request to the server.

These illustrative examples are given to introduce the reader to the general subject matter discussed here and are not intended to limit the scope of the disclosed concepts. The following sections describe various additional embodiments and examples with reference to the drawings in which like numerals indicate like elements. Other embodiments will readily suggest themselves to such skilled persons having the benefit of this disclosure. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative System

Figure 2:
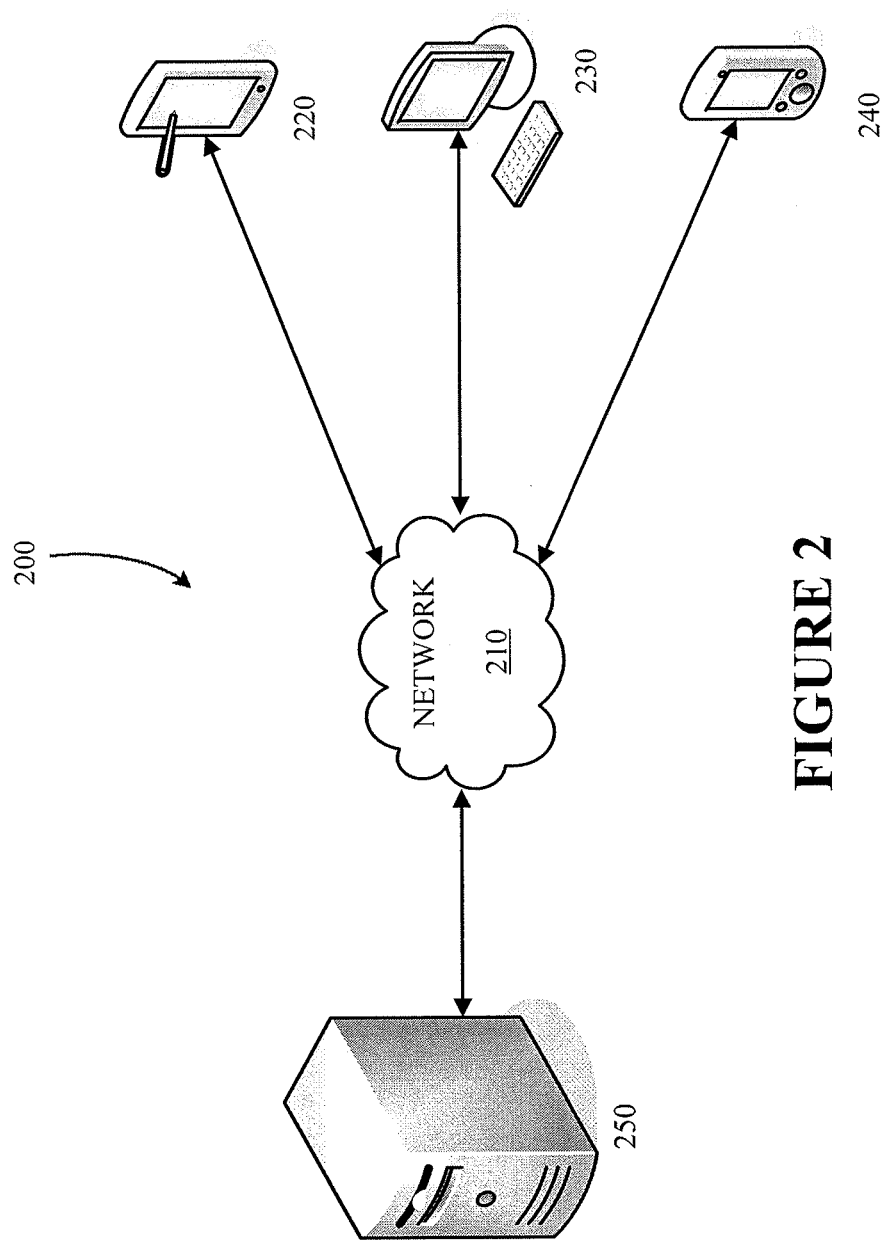
FIG. 2 is a system diagram depicting exemplary computing devices in an exemplary computing environment according to an embodiment.

FIG. 2 illustrates a system diagram depicting exemplary computing devices in an exemplary computing environment according to an embodiment. The system 200 shown in FIG. 2 includes three client devices, 220-240, and a web server 250. Each of the client devices, 220-240, and the web server 250 are connected to a network 210. In this embodiment, each of the client devices, 220-240, is in communication with the web server 250 through the network 210. Thus, each of the client devices, 220-240, can send requests to the web server 250 and receive responses from the web server 250 through the network 210.

In an embodiment, the network 210 shown in FIG. 2 facilitates communications between the client devices, 220-240, and the web server 250. The network 210 may be any suitable number or type of networks or links, including, but not limited to, a dial-in network, a local area network (LAN), wide area network (WAN), public switched telephone network (PSTN), the Internet, an intranet or any combination of hard-wired and/or wireless communication links. In one embodiment, the network 210 may be a single network. In other embodiments, the network 210 may comprise two or more networks. For example, the client devices 220-240 may be connected to a first network and the web server 250 may be connected to a second network and the first and the second network may be connected. Numerous other network configurations would be obvious to a person of ordinary skill in the art.

A client device may be any device capable of communicating with a network, such as network 210, and capable of sending and receiving information to and from another device, such as web server 250. For example, in FIG. 2, one client device may be a tablet computer 220. The tablet computer 220 may include a touch-sensitive display and be able to communicate with the network 210 by using a wireless network interface card. Another device that may be a client device shown in FIG. 2 is a desktop computer 230. The desktop computer 230 may be in communication with a display and be able to connect to the network 230 through a wired network connection. The desktop computer 230 may be in communication with any number of input devices such as a keyboard of a mouse. In FIG. 1, a mobile phone 240 may be a client device. The mobile phone 240 may be able to communicate with the network 210 over a wireless communications means such as TDMA, CDMA, GSM, or WiFi.

A device receiving a request from another device may be any device capable of communicating with a network, such as network 210, and capable of sending and receiving information to and from another device. For example, in the embodiment shown in FIG. 2, the web server 250 may be a device receiving a request from another device (i.e. client devices 220-240) and may be in communication with network 210. A receiving device may be in communication with one or more additional devices, such as additional servers. For example, web server 250 in FIG. 2 may be in communication with another server that encodes or segments, or both, media content from one or more audio or video inputs, or both. In this embodiment, the web server 250 may store the segmented media files on a disk drive or in cache, or both. In an embodiment, web server 250 may be in communication with one or more audio or video, or both, inputs. In one embodiment, a web server may communicate with one or more additional devices to process a request received from a client device. For example, web server 250 in FIG. 2 may be in communication with a plurality of additional servers, at least one of which may be used to process at least a portion of a request from any of the client devices 220-240. In one embodiment, web server 250 may be part of or in communication with a content distribution network (CDN) that stores data related to one or more media assets.

In one embodiment, web server 250 may simultaneously serve media content related to one or more media assets in multiple formats. For example, referring to FIG. 2, web server 250 may serve one or more HDS media segments and/or HDS media fragments related to a media asset to client device 220 in response to receiving a request from client device 220. In this embodiment, web server 250 may simultaneously serve one or more HLS media segments related to the same media asset to client device 230 in response to receiving a request from client device 230. Furthermore, in one embodiment, web server 250 may simultaneously send one or more HLS media segments, HDS media fragments, and/or HLS media segments to client device 240 in response to receiving a request from client device 240.

Illustrative Requesting or Receiving Device

Figure 3:
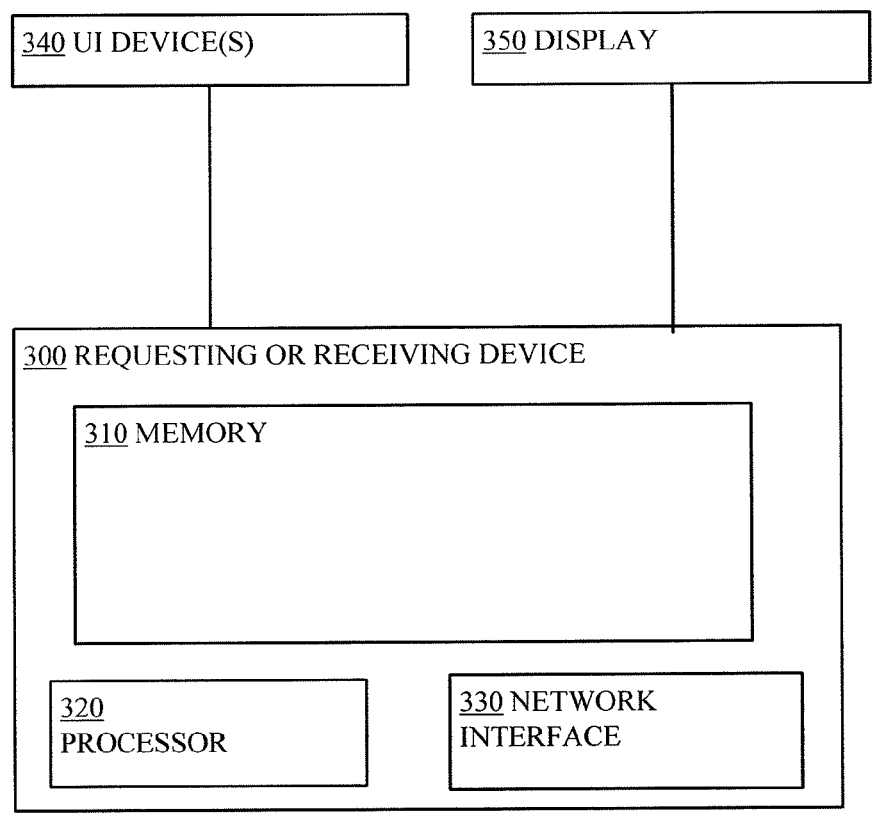
FIG. 3 is a block diagram depicting an exemplary requesting or receiving device according to an embodiment.

FIG. 3 is a block diagram depicting an exemplary requesting or receiving device according to an embodiment. For example, in one embodiment, the device 300 may be a web server, such as the web server 250 shown in FIG. 2. In this embodiment, the web server may be a Flash Media Streaming Server. The web server may be in communication with one or more additional devices such as an encoder. In an embodiment, the web server is capable of encoding one or more media assets. In other embodiments, device 300 may be a client device, such as the client devices 220-240 shown in FIG. 2. In various embodiments, device 300 may be a tablet computer, desktop computer, mobile phone, personal digital assistant (PDA), or a sever such as a web server, media server, or both.

As shown in FIG. 3, the device 300 comprises a computer-readable medium such as a random access memory (RAM) 310 coupled to a processor 320 that executes computer-executable program instructions and/or accesses information stored in memory 310. A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, SRAM, DRAM, CAM, DDR, flash memory such as NAND flash or NOR flash, an ASIC, a configured processor, optical storage, magnetic tape or other magnetic storage, or any other medium from which a computer processor can read instructions. In one embodiment, the device 300 may comprise a single type of computer-readable medium such as random access memory (RAM). In other embodiments, the device 300 may comprise two or more types of computer-readable medium such as random access memory (RAM), a disk drive, and cache. The device 300 may be in communication with one or more external computer-readable mediums such as an external hard disk drive or an external DVD drive.

The embodiment shown in FIG. 3, comprises a processor, 320 which executes computer-executable program instructions and/or accesses information stored in memory 310. The instructions may comprise processor-specific instructions generated by a compiler and/or an interpreter from code written in any suitable computer-programming language including, for example, C, C++, C#, Visual Basic, Java, Python, Perl, JavaScript, and ActionScript®. In an embodiment, the device 200 comprises a single processor 320. In other embodiments, the device 300 comprises two or more processors.

The device 300 as shown in FIG. 3 comprises a network interface 330 for communicating via wired or wireless communication. For example, the network interface 230 may allow for communication over networks via Ethernet, IEEE 802.11 (Wi-Fi), 802.16 (Wi-Max), Bluetooth, infrared, etc. As another example, network interface 330 may allow for communication over networks such as CDMA, GSM, UMTS, or other cellular communication networks. The device 300 may comprise two or more network interfaces 330 for communication over one or more networks.

The device 300 may comprise or be in communication with a number of external or internal devices such as a mouse, a CD-ROM, DVD, a keyboard, a display, audio speakers, one or more microphones, or any other input or output devices. For example, the device 300 shown in FIG. 3 is in communication with various user interface devices 340 and a display 350. Display 350 may use any suitable technology including, but not limited to, LCD, LED, CRT, and the like.

Device 300 may be a server, a desktop, a personal computing device, a mobile device, or any other type of electronic devices appropriate for providing one or more of the features described herein.

Method of Dynamically Generating a Playlist

Figure 4:
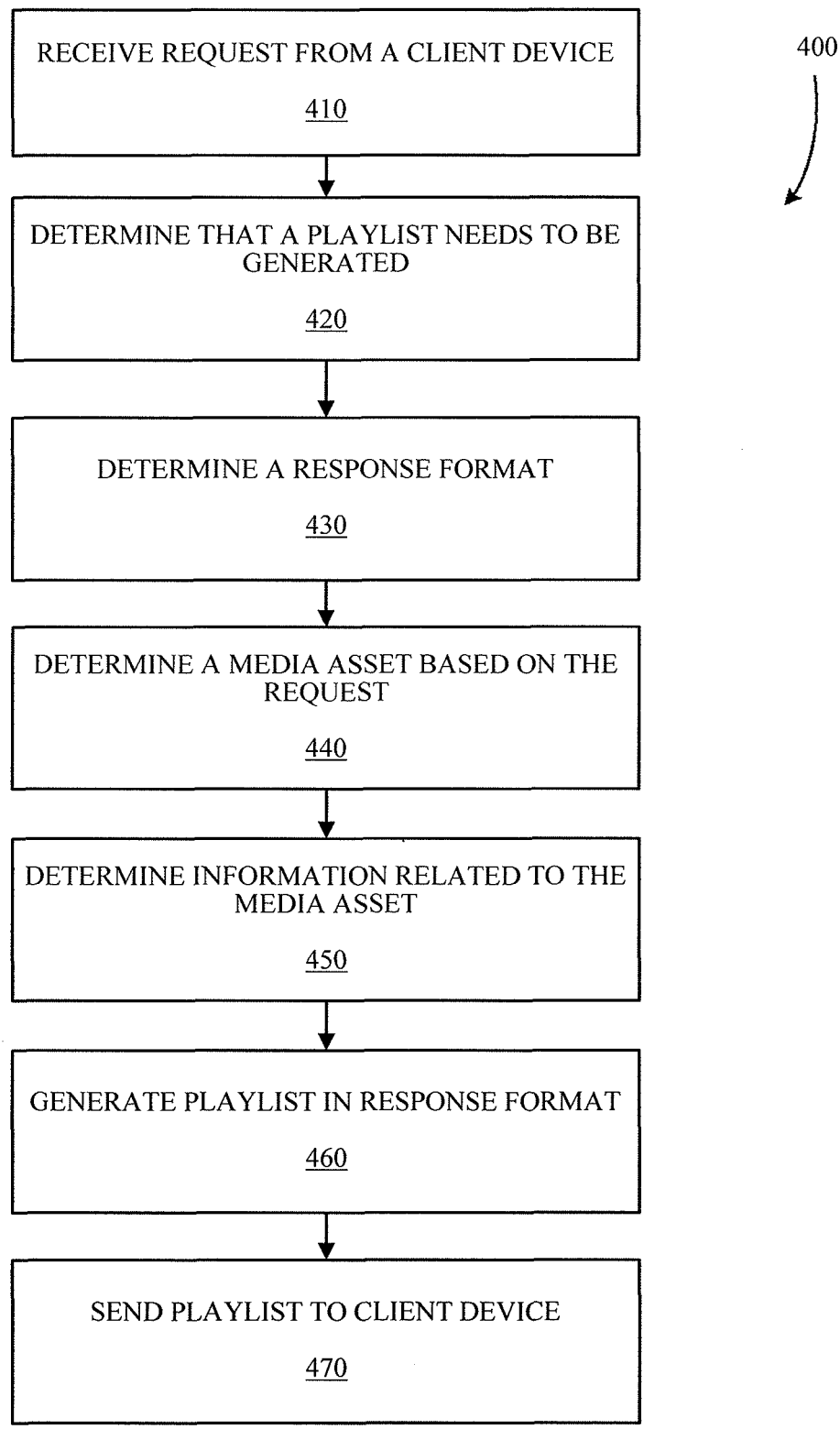
FIG. 4 is a flow chart illustrating a method of receiving and responding to a request according to an embodiment.

Referring now to FIG. 4, FIG. 4 illustrates a flow chart directed to a method 400 of receiving and responding to a request from a client device. The description of the method 400 of FIG. 4 will be made with respect to FIG. 2 according to an embodiment.

The method 400 shown in FIG. 4 begins when a request is received from a client device 410. For example, referring to FIG. 2, web server 250 may receive an HTTP request from desktop computer 230 through network 210.

A request may be sent by a client device and received by a server over any number of protocols. In one embodiment, a request is sent by a client device 220-240 and received by the web server 250 through network 210 over Hypertext Transfer Protocol (HTTP). In another embodiment, a request is sent by a client device 220-240 and received by the web server 250 through network 210 over Hypertext Transfer Protocol Secure (HTTPS). A request may be received over HTTP or other stateless transport mechanism. Such a stateless transport mechanism may be associated with a protocol that has at least some characteristics that are similar to HTTP. Numerous additional embodiments and implementations will be obvious to one of skill in the art.

A request may include information usable by the receiving device to determine whether a playlist needs to be generated. In one embodiment, a request includes one or more Uniform Resource Identifiers (URIs). Examples of URIs include, but are not limited to, Uniform Resource Locators (URLs) and Uniform Resource Names (URNs). A URI can have any number of schemes. Examples of URI schemes include, but are not limited to, FTP, H323, HTTP, HTTPS, Real Time Streaming Protocol (RTSP), Real Time Messaging Protocol (RTMP), Java Archive (JAR), User Datagram Protocol (UDP), and Extensible Resource Identifier (XRI). In some embodiments, a URI conforms to RFC 3986 "Uniform Resource Identifier (URI): Generic Syntax" available at http://www.ietf.org/rfc/rfc3986.txt which is hereby incorporated by reference. A request having a URI may contain information including, but not limited to, some or all of the following: a scheme name, user information such as a username or a password or both, a hostname, a port, a path, a query, and a fragment.

Referring back to FIG. 4, after receiving a request from a client device 410, the method 400 proceeds to block 420. In block 420, a determination is made that a playlist needs to be generated. For example, web server 250 may determine that a playlist needs to be generated based at least in part on a request received from tablet computer 220 through network 210.

In determining that a playlist needs to be generated, a server receiving a request may parse or otherwise analyze the received request. A server receiving a request may parse or otherwise analyze a URI of a received request. For example, a determination that a playlist needs to be generated may be based on a path specified in the URI of a received request. In one embodiment, at least a portion of a path specified in a request is separated by a delimiter, such as a "/", "&", or ":". In such an embodiment, the path may be used to determine that a playlist needs to be generated. For example, referring to FIG. 2, if "/mediaAsset/playList/" is a path specified in a request received by web server 250, then the web server 250 may determine that a playlist needs to be generated because the path contains the word "playList". In another embodiment, if a request includes a path "/getList/", then a server receiving the request may be able to determine that a playlist needs to be generated based on "getList" specified in the path.

A determination that a playlist needs to be generated may be based on a protocol specified in a path of a received request. For example, in one embodiment, a request contains a path "/HLS/getList/". In this embodiment, a server receiving the request may determine that a playlist needs to be generated because "getList" indicates that the client device wants a playlist and "HLS" indicates that the client device wants to receive a response compatible with HTTP Live Streaming (HLS) protocol. In some embodiments, a playlist may need to be generated if a path indicates that one protocol should be used and a playlist may not need to be generated if a path indicates that another protocol should be used. For example, in one embodiment, if a path specified in a request indicates that HLS should be used then a server receiving the request may determine that a playlist needs to be generated. In this embodiment, however, if a path specified in a request indicates that HTTP Dynamic Streaming (HDS) should be used, then the server may determine that a playlist does not need to be generated. In other embodiments, if a path specified in a request indicates that HDS should be used, then the server may determine that a playlist needs to be generated.

A determination that a playlist needs to be generated may be based on a filename specified in a request. For example, a portion of a path specified in a URI in a request may be interpretable by a server receiving the request as a filename. As one example, if a server receives a request from a client device and the request contains information indicating that a file having the name "mediaAssetPlaylist" should be sent to the client device, then the server may determine that a playlist needs to be generated based on the text "Playlist" in the filename. In another embodiment, if a server receives a request from a client device and the request contains information that a file having the name "mediaAssetHLS" should be sent to the client device, then the server may determine that a playlist needs to be generated based on "HLS" in the filename which indicates that HLS should be used for the media asset referenced by "mediaAsset" in the filename.

A determination that a playlist needs to be generated can be based on a file extension specified in a request. For example, a portion of a path specified in a URI of a request may be interpretable by a server receiving the request as a file extension. In one embodiment, if the path "/folder1/folder2/mediaAsset.m3u8" is received in a request by a server, then the server may be able to parse or otherwise analyze the path specified in the request to determine that a client device that sent the request wants to receive a playlist having the extension .m3u8 Or wants to receive a playlist compatible with M3U8 format, or both. In this embodiment, based on the determined extension or format, or both, the server may determine that a playlist needs to be generated.

A determination that a playlist needs to be generated may be based on a query or URI fragment, or both, specified in a request. For example, a query or fragment specified in a URI in a request may be interpretable by a server receiving the request to determine that a playlist needs to be generated. In one embodiment, a query or fragment, or both, received in a request may be used to specify a protocol that the server uses to determine that a playlist needs to be generated. For example, a query or fragment, or both, in a received request may contain the text "protocol=HLS" which the server uses to determine that a playlist needs to be generated. In another embodiment, a query or URI fragment, or both, received in a request may be used to determine an Internet media type, Multipurpose Internet Mail Extensions (MIME-type), and/or a content-type which indicates that a playlist needs to be generated. In this embodiment, the server receiving the request may determine that a playlist needs to be generated based on the determined Internet media type, MIME-type, and/or content-type. For example, a query or a fragment received in a request, or some other portion of the request, may contain the text "mimeType=application/x-mpegURL" which the server uses to determine that the request is for a playlist having a M3U8 format that needs to be generated.

A determination that a playlist needs to be generated can be based on whether a server receiving a request can access a file specified in a request. For example, a request may indicate a client device wants a file "mediaAssetPlaylist.m3u8". In one embodiment, if the server cannot access the file mediaAssetPlaylist.m3u8 or a file associated with mediaAssetPlaylist.m3u8, or both, stored in a cache on the server, then the server may determine that a playlist needs to be generated. In one embodiment, if the server cannot access the file mediaAssetPlaylist.m3u8 or a file associated with mediaAssetPlaylist.m3u8, or both, stored in memory on the server, then the server may determine that a playlist needs to be generated. In other embodiments, if the server cannot access the file mediaAssetPlaylist.m3u8 or a file associated with mediaAssetPlaylist.m3u8, or both, stored on a disk drive in communication with the server then the server determines that a playlist needs to be generated.

A determination that a playlist needs to be generated may be based at least in part on a combination of two or more of a URI, path, filename, file extension, Internet content type, MIME-type, content-type, protocol, query, fragment, etc. specified in a request. In some embodiments, a determination that a playlist needs to be generated may be based at least in part on one or more of a filename, file extension, Internet content type, MIME-type, content-type, or protocol determined by a server receiving the request based at least in part on information contained in the request. For example, a server may access one or more data stores to determine that a playlist needs to be generated based at least in part on a received request. Numerous additional embodiments and implementations would be obvious to one of ordinary skill in the art.

Referring back to FIG. 4, after determining that a playlist needs to be generated 420, the method 400 proceeds to block 430. In block 430, a response format is determined. For example, web server 250 may determine a response format based at least in part on a request received from mobile phone 230 through network 210.

In determining a response format, a server receiving a request may parse or otherwise analyze the received request. For example, a server receiving a request may parse or otherwise analyze a URI of a received request. In one embodiment, a response format may be determined based on a path specified in the received request. At least a portion of a path specified in a request may be separated by a delimiter, such as a "/", "&", or ":". In such an embodiment, the path may be used to determine a requested format. For example, referring to FIG. 2, if "/mediaAsset/playList/M3U8/" is a path specified in a request received by web server 250, then the web server 250 may determine that the requested format is M3U8 because the path contains the word "M3U8". In other words, a server may determine a response format based on at least a portion of the path specified in a request including the name of a format in which the requesting device wants to receive a response.

A response format may be determined based on a protocol specified in a path of a received request. For example, in one embodiment, a request contains a path "/HLS/getList/". In this embodiment, a server receiving the request may determine a response format because "HLS" in the path indicates that the client device wants to receive a response in a format compatible with HLS. Thus, in this embodiment, the server may determine that a response should be in an M3U8 format because such a format is compatible with HLS.

A response format may be determined based on a filename specified in a request. For example, a portion of a path specified in a URI in a request may be interpretable by a server receiving the request as a filename. As one example, if a server receives a request from a client device and the request contains information indicating that a file having the name "mediaAssetHLSPlaylist" should be sent to the client device, then the server may determine that a response format compatible with HLS should be used because the filename contains a protocol (i.e. HLS) for which a response should be compatible. In this embodiment, the server may determine that a M3U8 format should be used as the response format because a M3U8 format is compatible with HLS. In another embodiment, if a server receives a response from a client device and the request contains information that a file having the name "mediaAssetM3U8", then the server may determine that a M3U8 format should be used for the response format because the filename indicates the format that should be used.

A response format may be based on a file extension specified in a request. For example, a portion of a path specified in a URI of a request may be interpretable by a server receiving the request as a file extension. In one embodiment, if a request containing the path "folder1/playlist.m3u8" is received by a server from a client device, then the server may be able to parse or otherwise analyze the path specified in the request to determine that the client device that sent the request wants to receive a response in a M3U8 format. In this embodiment, the server may determine a response format based on the ".m3u8" file extension specified in the path or filename, or both, of the request.

A response format may be based on a query or URI fragment, or both, specified in a request. For example, a query or a URI fragment, or both, specified in a URI in a request may be interpretable by a server receiving the request to determine a response format. For example, if a request contains a query with the text "responseFormat=M38U", then a server receiving the request may determine that a response format for the request should be in a M3U8 format. In one embodiment, a query or URI fragment, or both, received in a request is used to specify a protocol that the server can use to determine a response format. For example, a query or URI fragment, or both, in a received request may contain the text "protocol=HLS" which the server uses to determine a response format. Thus, in this embodiment, the server receiving the request may determine that a response should be in a format compatible with HLS. For example, the server may determine that a M3U8 format should be used because the M3U8 format is compatible with HLS protocol. In another embodiment, a query or URI fragment, or both, received in a request may be used to determine an Internet media type, MIME type, and/or a content-type which indicates a response format. In this embodiment, the server receiving the request may determine a response format based on the determined Internet media type, MIME type, and/or content-type. For example, a query or URI fragment received in a request may contain the text "mimeType=application/x-mpegURL" which the server uses to determine that a response should be in a M3U8 format.

A response format may be determined based at least in part on a combination of two or more of a URI, path, filename, file extension, Internet content type, MIME type, content-type, protocol, query, URI fragment, etc. specified in a request. In some embodiments, a response format may be determined based at least in part on one or more of a filename, file extension, Internet content type, MIME-type, content-type, or protocol determined by a server receiving the request based at least in part on information contained in the request. For example, a server may access one or more data stores to determine a response format based at least in part on a received request. Numerous additional embodiments and implementations would be obvious to one of ordinary skill in the art.

Referring back to FIG. 4, after determining a response format 430, the method 400 proceeds to block 440. In block 440, a media asset is determined based at least in part on the received request. For example, web server 250 may determine a media asset based at least in part on a request received from tablet computer 220 through network 210.

A media asset can be associated with media content. For example, in one embodiment, a media asset refers to a particular movie. In other embodiments, a media asset may be associated with a video, a television show, a video clip, a song, a piece of music, a live video broadcast, a live audio broadcast, a live video and audio broadcast, an audio stream, a video stream, an audio and video stream, or other media content. In one embodiment, a media asset is associated with live media content. In another embodiment, a media asset is associated with video on demand (VOD). In other embodiments, a media asset may be associated with audio and video on demand (A VOD). In one embodiment, a media asset is associated with a live event. In this embodiment, as the live event takes place, one or more media segments or media fragments, or both, associated with the media asset may be added to the media asset. For example, a media asset may be associated with more media segments or media fragments, or both, ten minutes into a live event than five minutes into the live event. In this embodiment, the current time or the total duration, or both, for the media asset may change as the live event takes place.

Figure 5:
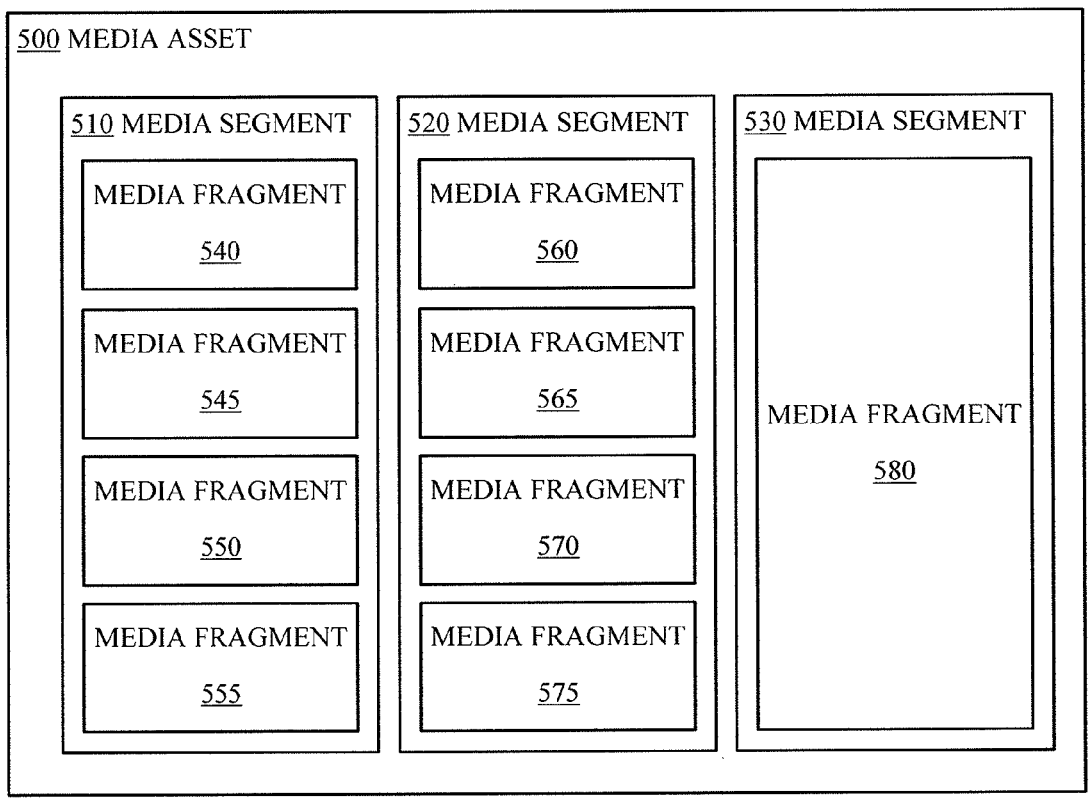
FIG. 5 is a block diagram depicting a media asset according to an embodiment.

A media asset may be associated with any number of files. For example, FIG. 5 illustrates a media asset 500 according to an embodiment. In the embodiment shown in FIG. 5, the media asset is associated with one or more media files, such as media segments or media fragments, or both, that contain media data. For example, the media asset 500 in FIG. 5 is related to three media segments 510-530. A media segment may contain media data related to the media asset. For example, media segment 510 may contain seconds 0 to 10 of a video associated with media asset 500. In some embodiments, a media segment may contain additional information related to a media asset such as metadata. Media segments associated with a media asset may have equal or varying durations. For example, in one embodiment, media segments 510, 520, and 530 each have a duration of 10 seconds. In this embodiment, the media asset 500 may be associated with a video clip with a total time or a total duration of 30 seconds. In one embodiment, the media asset 500 may be associated with a live event having a current time or a current duration, or both. In another embodiment, media segment 510 has a duration of 10 seconds, media segment 520 has a duration of 20 seconds, and media segment 530 has a duration of 5.5 seconds.

In one embodiment, a media segment is associated with one or more fragments. For example, in FIG. 5, each media segment 510-520 is divided into one or more media fragments 540-580. As shown in FIG. 5, media segment 510 contains four media fragments 540-555, media segment 520 contains four media fragments 560-575, and media segment 530 contains one media fragment 580. A media fragment may contain media data related to a media asset. For example, media fragment 540 may contain seconds 0 to 2 of media segment 510 which contains seconds 0 to 10 of a movie associated with media asset 500. In some embodiments, a media fragment may contain additional information related to a media asset or a media segment, or both, such as metadata. Media fragments associated with a media segment or a media asset, or both, may have equal or varying durations. For example, in one embodiment, media fragments 540-555 each have a duration of 5 seconds. In this embodiment, media segment 510 may be associated with a piece of media content for the media asset 500 having a duration of 20 seconds. In another embodiment, media fragment 540 has a duration of 10 seconds, media fragment 545 has a duration of 2 seconds, media fragment 550 has a duration of 20 seconds, and media fragment 555 has a duration of 1 second.

A media asset may be associated with one or more files that provide information related to media segments or media fragments, or both. For example, a media asset may be associated with an index file related to a media asset. In one embodiment, an index file for a media asset provides information such as a duration for the media asset. In another embodiment, an index file for a media asset provides a list of media segments or media fragments, or both, associated with the media asset. For example, referring to FIG. 5, an index file for media asset 500 may provide that each media segment 510-530 has a duration of 10 seconds and the overall duration of the media asset 500 is 30 seconds. In this embodiment, the index file may contain information, such as URIs or offsets, that enables a server to obtain one or more media segments or media fragments. For example, referring still to FIG. 5, an index file for media asset 500 may contain a link to media segment 510 as well as links to media fragments 540-555. In another embodiment, an index file for a media asset provides offsets that can be used to identify one or more media segments or media fragments, or both, associated with a media asset. For example, referring to FIG. 5, an index file for media asset 500 may provide offsets that can be used to identify or obtain, or both, one or more media segments or media fragments, or both. In one embodiment, an index file provides metadata associated with a media asset. In one embodiment, an index file provides metadata associated with a media asset.

In one embodiment, a media asset may be associated with one or more files that provide bootstrap information related to the media asset. Bootstrap information can include information needed by a server to generate a playlist such as a start time and a total time for a media asset. Bootstrap information may contain a current time for a media asset. Bootstrap information may be contained in one or more media segments for a media asset, in one or more media fragments for a media asset, in one or more indexes for a media asset, or in one or more separate files associated with a media asset. In one embodiment, bootstrap information comprises a run table that stores a sequence of elements that are expected to have the same duration. For example, a single record in a fragment run table may represent a series of fragments having the same duration. Bootstrap information may include a list of web servers where data associated with a media asset is stored. For example, if a media segment is known to be stored on two servers, then bootstrap information may include a URI for each server storing the media segment. In some embodiments, one or more files containing bootstrap information also contains metadata related to a media asset. In various embodiments, bootstrap information may include information about one or more servers, media segments, or media fragments related to a media asset. In some embodiments, bootstrap information may include durations, start times, end times, etc. related to a media asset, one or more media segments related to the media asset, one or more media fragments related to the media asset, or a combination thereof.

Referring back to FIG. 4, in determining a media asset associated with a request, a server receiving a request may parse or otherwise analyze the received request. For example, a server receiving a request may parse or otherwise analyze a URI of a received request. In one embodiment, a media asset may be determined based on a path specified in the received request. For example, in an embodiment, at least a portion of a path specified in a request is separated by a delimiter, such as a "/", "&", or ":". In such an embodiment, the path may be used to specify a media asset. For example, referring to FIG. 2, if "/baseballGame1234/playList/" is a path specified in a request received by web server 250, then the web server 250 may determine that the request is associated with a media asset entitled "baseballGame1234". In another embodiment, if a request includes a path "/video2/", then a server receiving the request may determine that the request is associated with a media asset entitled "video2" as specified in the path.

A media asset may be determined based on a filename specified in a request. For example, a portion of a path specified in a URI in a request may be interpretable by a server receiving the request as a filename. As one example, if a server receives a request from a client device and the request contains "/folder1/folder2/baseballGamePlaylist.m3u8", then the server may determine that the request is associated with the filename "baseballGamePlaylist" and that the filename is associated with a media asset entitled "baseballGame". In another embodiment, if a server receives a request from a client device and the request contains information indicating that the request is associated with a file having the name "HLSvideo1234", then the server may determine that the request is associated with a media asset entitled "video1234" based on a portion of the filename.

A media asset may be determined based on a query or a fragment, or both, specified in a request. For example, a query or fragment specified in a URI in a request may be interpretable by a server receiving the request to determine a media asset associated with the request. In one embodiment, a query containing the text "?mediaAsset=baseketball202" is received by a server and the server interprets the query to determine that a media asset entitled "basketball202" is associated with the request. In another embodiment, a request containing a query having the text "mediaId=10" is received by a server from a client device. In this embodiment, the server may determine that the request is associated with a media asset having an identification of "10". In addition, the server may access one or more data stores—such as a database containing media IDs referenced with media assets—to determine a media asset associated with the identification specified in the request. In other embodiments, the server may access one or more files that are used to determine a media asset associated with a received request.

Referring back to FIG. 4, after determining a media asset based at least in part on a received request 440, the method 400 proceeds to block 450. In block 450, information related to the media asset is determined. For example, web server 250 may determine information related to a media asset such as a start time or a duration, or both.

Information related to the media asset may include numerous types of information. For example, information related to the media asset may include a duration for the media asset. In one embodiment, information related to the media asset includes a start time, an end time, or a duration, or a combination thereof, for one or more media segments or one or more media fragments, or both, related to the media asset. Information related to the media asset may include one or more locations or filenames, or both, where at least a portion of the media asset can be found. For example, in one embodiment, information related to the media asset includes a list of media segments or media fragments, or both, as well as a duration for each media segment or media fragment. In one embodiment, information related to the media asset includes a start time related to the media asset, a media segment, or a media fragment, or a combination thereof.

Information related to the media asset may be determined by accessing one or more files related to the media asset. For example, information related to the media asset may be determined by accessing one or more media segments related to the media asset. Information related to the media asset may be determined by accessing one or more media fragments related to the media asset. In one embodiment, one or more index files related to the media asset may be accessed to determine information related to the media asset. In another embodiment, one or more files containing metadata associated with the media asset are accessed to determine information related to the media asset. In other embodiments, one or more files containing bootstrap information related to the media asset may be accessed to determine information related to the media asset. One or more data stores containing information related to the media asset may be accessed to determine information related to the media asset. Numerous additional embodiments and implementations would be obvious to one of ordinary skill in the art.

After determining information related to the media asset 450, the method 400 proceeds to block 460. In block 460, a playlist is generated in the determined response format. For example, if a determined response format is M3U8, then a playlist having an M3U8 format may be generated by web server 250.

In one embodiment, a generated playlist includes information that identifies one or more media files related to the media asset. For example, a generated playlist may contain one or more URIs. In one embodiment, each URI in the generated playlist corresponds with a time segment of the media asset. For example, one URI in the generated playlist may correspond with seconds 0 to 10 of a media asset and another URI may correspond with seconds 10 to 20 of the media asset. In another embodiment, a first URI in the generated playlist corresponds with media content related to a media asset having a bandwidth of 200000 and a second URI in the generated playlist corresponds with media content related to the media asset having a bandwidth of 500000. In this embodiment, the content of the media asset corresponding with each URI may be the same but may stream at different bandwidths. A bandwidth specified in a URI may correspond to a data transfer rate. For example, bandwidth may refer to an amount of data to be sent in a period of time. In one embodiment, bandwidth refers to an amount of data that can be carried from one point to another point in a given period of time. In another embodiment, a media asset has a duration of 20 seconds and a first URI in the generated playlist corresponds with seconds 0 to 10 of the media asset having a bit rate of 200000, a second URI in the generated playlist corresponds with seconds 0 to 10 of the media asset having a bit rate of 500000, a third URI in the generated playlist corresponds with seconds 10 to 20 of the media asset having a bit rate of 200000, and a fourth URI in the generated playlist corresponds with seconds 10 to 20 of the media asset having a bit rate of 500000. A bit rate specified in a URI may correspond with a number of bits that can be conveyed or processed in a given period of time. A bit rate specified in a URI can refer to a quality of media data related to a media asset. For example, if a media asset corresponds with a movie, then the movie may have higher quality video or audio, or both, if the request specifies a bit rate of 2000 Kbps than if the request specifies a bit rate of 1000 Kbps. In this embodiment, a bit rate may be related to a quality for a media asset. Numerous additional embodiments and implementations would be obvious to one of ordinary skill in the art.

In one embodiment, a playlist may be generated based at least in part on a determined start time and total time for the determined media asset. In another embodiment, a playlist may be generated based at least in part on a determined current time for the determined media asset. A generated playlist may contain information identifying one or more media segments or media fragments, or both. For example, if the determined media asset is entitled "myVideo" and it is determined that the media asset starts at time zero and has a total length of fifteen seconds, then the generated playlist may include three URIs with each URI identifying five seconds of the media asset. Thus, in this embodiment, one URI in the generated playlist corresponds with seconds 0 to 5 of "myVideo", a second URI in the generated playlist corresponds with seconds 5 to 10 of "myVideo", and a third URI in the generated playlist corresponds with seconds 10 to 15 of the generated playlist. A generated playlist may include information that indicates that a URI in the playlist is compatible with a particular protocol or is in a particular format, or both. For example, in one embodiment, each URI in a generated playlist includes a file extension of .ts which indicates that the URI is related to a media segment or media fragment, or both, that has a MPEG-2 TS format and is compatible with HLS.

A naming scheme may be used to identify one or more media segments or media fragments, or both, in the generated playlist. For example, a naming scheme may be used for one or more URIs contained in a generated playlist. In one embodiment, the generated playlist contains URIs corresponding with media segments or media fragments, or both, according to the following scheme: "fileNameNumX.ts". In this embodiment, the "fileName" portion of the URI corresponds with a name of the media asset, "NumX" reference to a sequence number, and ".ts" refers to a file extension indicating that the URI is related to a file having an MPEG-2 TS format. A generated playlist may include information indicating that each of the URIs in the playlist corresponds with a media segment or a media fragment, or both, having an equal duration. For example, the generated playlist may contain "#EXT-X-TARGETDURATION:10" which indicates that at least one of the URIs in the playlist correspond with a media segment or a media fragment, or both, having a duration of 10 seconds. In other embodiments, a generated playlist includes information indicating that one or more of the URIs in the playlist has one or more media segments or media fragments, or both, that have different durations. The playlist may be generated in substantially real-time. In embodiments, the generated playlist may be stored on a disk drive. In other embodiments, the generated playlist may not be stored on a disk drive.

In an embodiment, one or more URIs in a generated playlist corresponds with a file that does not exist on the device generating the playlist. In one embodiment, one or more URIs in a generated playlist corresponds with a file that does not exist. In this embodiment, a URI may refer to an imaginary file. In an embodiment, referring to FIG. 2, web server 250 may generate a playlist that contains a URI. In this embodiment, a portion of the URI in the generated playlist may contain the text "myVideo2.ts". The file "myVideo2.ts" may not actually exist on the server. For example, in one embodiment, the file "myVideo2.ts" may not be stored on a hard drive associated with the web server 250. In another embodiment, the file "myVideo2.ts" may not be stored in memory or cache, or both, associated with web server 250. In one embodiment, the web server 250 generates the playlist in the response format and the generated playlist contains at least one URI is interpretable by the web server 250 when received in a request to determine one or more media files related to the media asset based at least in part on information contained in the URI. Numerous additional embodiments and implementations would be obvious to one of ordinary skill in the art.

After generating the playlist in the response format 460, the method 400 proceeds to block 470. In block 470, the generated playlist is sent to the requesting device. For example, referring to FIG. 2, the web server 250 may send the generated playlist to a requesting device, such as a client device 220-240, through network 210. After sending the generated playlist to the client device, the generated playlist may be deleted. In embodiments, the generated playlist may never be stored on a disk drive.

Method of Dynamically Converting Media

Figure 6:
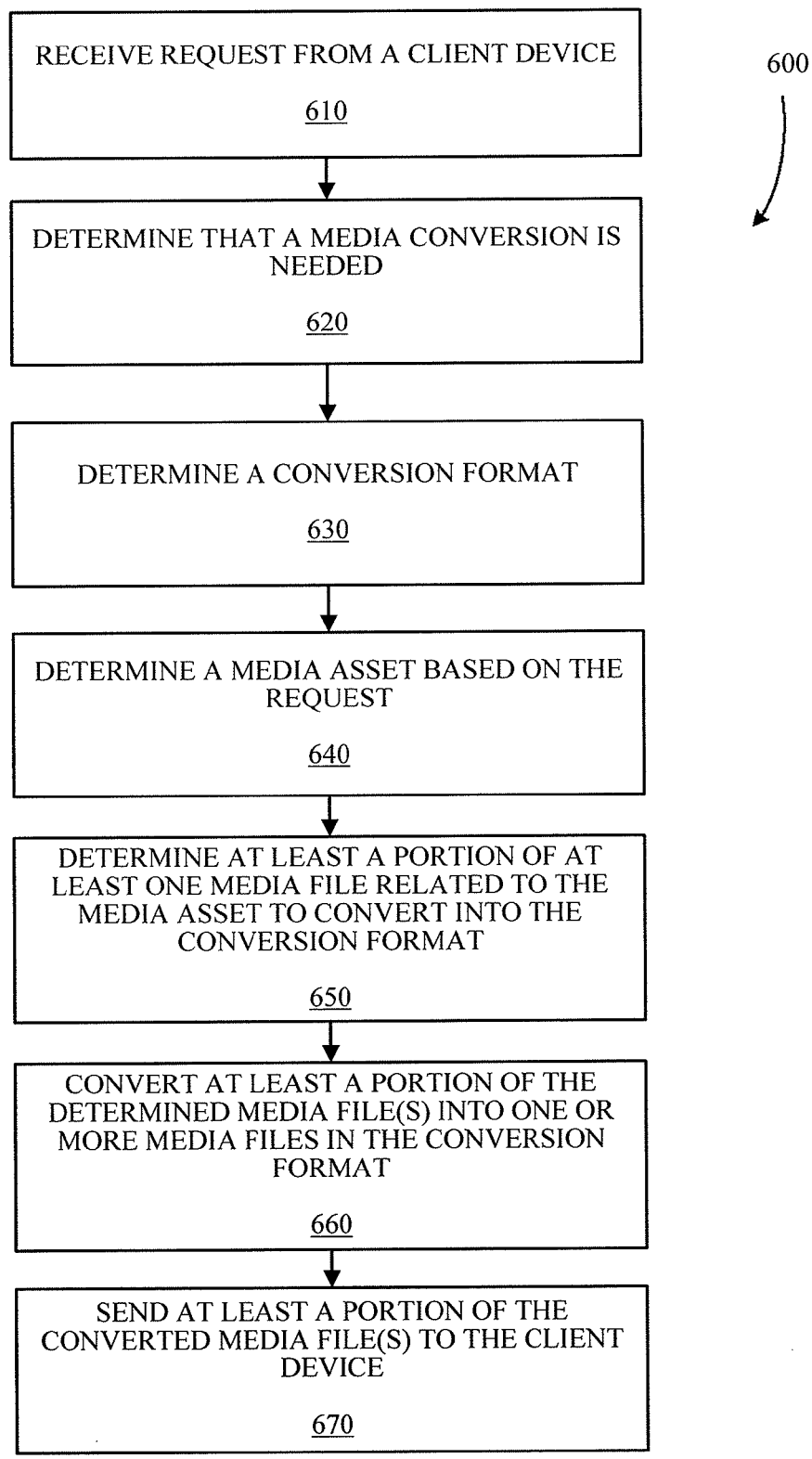
FIG. 6 is a flow chart illustrating a method of receiving and responding to a request according to an embodiment.

Referring now to FIG. 6, FIG. 6 illustrates a flow chart directed to a method 600 of receiving and responding to a request from a client device. The description of the method 600 of FIG. 6 will be made with respect to FIG. 2 according to an embodiment.

The method 600 shown in FIG. 6 begins when a request is received from a client device 610. For example, referring to FIG. 2, web server 250 may receive an HTTP request from desktop computer 230 through network 210.

A request may be sent by a client device and received by a server over any number of protocols. In one embodiment, a request is sent by a client device 220-240 and received by the web server 250 through network 210 over Hypertext Transfer Protocol (HTTP). In another embodiment, a request is sent by a client device 220-240 and received by the web server 250 through network 210 over Hypertext Transfer Protocol Secure (HTTPS). Such a stateless transport mechanism may be associated with a protocol that has at least some characteristics that are similar to HTTP. Numerous additional embodiments and implementations will be obvious to one of skill in the art.

A request may include information usable by the receiving server to determine whether a playlist needs to be generated. In an embodiment, a request includes one or more Uniform Resource Identifiers (URIs). Examples of URIs include, but are not limited to, Uniform Resource Locators (URLs) and Uniform Resource Names (URNs). A URI can have any number of schemes. Examples of URI schemes include, but are not limited to, FTP, H323, HTTP, HTTPS, Real Time Streaming Protocol (RTSP), Real Time Messaging Protocol (RTMP), Java Archive (JAR), User Datagram Protocol (UDP), and Extensible Resource Identifier (XRI). In some embodiments, a URI conforms to RFC 3986 "Uniform Resource Identifier (URI): Generic Syntax" available at http://www.ietf.org/rfc/rfc3986.txt which is hereby incorporated by reference. A request having a URI may contain information including, but not limited to, some or all of the following: a scheme name, user information such as a username or a password or both, a hostname, a port, a path, a query, and a fragment.

Referring back to FIG. 6, after receiving a request from a client device 610, the method 600 proceeds to block 620. In block 620, a determination is made that a media conversion is needed. For example, web server 250 may determine that a media conversion is In determining that a media conversion is needed, a server receiving a request may parse or otherwise analyze the received request. A server receiving a request may parse or otherwise analyze a URI of a received request. For example, a determination that a media conversion is needed may be based on a path specified in the URI of a received request. In one embodiment, at least a portion of a path specified in a request is separated by a delimiter, such as a "/", "&", or ":". In such an embodiment, the path may be used to determine that a media conversion is needed. For example, referring to FIG. 2, if "/mediaAsset/convertMedia" is a path specified in a request received by web server 250, then the web server 250 may determine that a media conversion is needed because the path contains the word "convertMedia". In another embodiment, if a request includes a path "/mediaAssetConvert/", then a server receiving the request may be able to determine that a media conversion is needed based on "mediaAssetConvert" specified in the path.

A determination that a media conversion is needed may be based on a protocol specified in a path of a received request. For example, in one embodiment, a request contains a path "/HLS/mediaAsset/". In this embodiment, a server receiving the request may determine that a media conversion is needed because "HLS" indicates that the client device wants to receive a response compatible with HTTP Live Streaming (HLS) protocol. In some embodiments, a media conversion may be needed if a path indicates that one protocol should be used and a media conversion may not be needed if a path indicates that another protocol should be used. For example, in one embodiment, if a path specified in a request indicates that HLS should be used then a server receiving the request may determine that a media conversion is needed. In this embodiment, however, if a path specified in a request indicates that HTTP Dynamic Streaming (HDS) should be used, then the server may determine that a media conversion is not needed. In other embodiments, if a path specified in a request indicates that HDS should be used, then the server may determine that a media conversion is needed.

A determination that a media conversion is needed may be based on a filename specified in a request. For example, a portion of a path specified in a URI in a request may be interpretable by a server receiving the request as a filename. As one example, if a server receives a request from a client device and the request contains information indicating that a media file having the name "myVideo2HLS" should be sent to the client device, then the server may determine that a media conversion is needed based on the text "HLS" in the filename.

A determination that a media conversion is needed can be based on a file extension specified in a request. For example, a portion of a path specified in a URI of a request may be interpretable by a server receiving the request as a file extension. In one embodiment, if the path "/folder1/folder2/mediaSegment1.ts" is received in a request by a server, then the server may be able to parse or otherwise analyze the path specified in the request to determine that a client device that sent the request wants to receive one or more media files having the extension .ts extension or wants to receive one or more media file having a MPEG-2 Transport System (MPEG2TS) format, or both. In this embodiment, based on the determined extension or format, or both, the server may determine that a media conversion is needed.

A determination that a media conversion is needed may be based on a query or fragment, or both, specified in a request. For example, a query or fragment specified in a URI in a request may be interpretable by a server receiving the request to determine that a media conversion is needed. In one embodiment, a query or fragment, or both, received in a request may be used to specify a protocol that the server uses to determine that a media conversion is needed. For example, a query or fragment, or both, in a received request may contain the text "protocol=HLS" which the server uses to determine that a media conversion is needed. In another embodiment, a query or fragment, or both, received in a request may be used to determine an Internet media type, Multipurpose Internet Mail Extensions (MIME-type), and/or a content-type which indicates that a media conversion is needed. In this embodiment, the server receiving the request may determine that a media conversion is needed based on the determined Internet media type, MIME-type, and/or content-type. For example, a query or a fragment received in a request, or some other portion of the request, may contain the text "mimeType=video/MP2T" which the server uses to determine that the request is for one or more files having a MPEG-2 format.

In one embodiment, a determination that a media conversion is needed is based on whether a server receiving a request can access a file specified in a request. For example, a request may indicate a client device wants a file "myVideo5.ts". In one embodiment, if the server cannot access the file myVideo5.ts or a file associated with myVideo5.ts, or both, stored in a cache on the server, then the server may determine that a media conversion is needed. In one embodiment, if the server cannot access the file myVideo5.ts or a file associated with myVideo5.ts, or both, stored in memory on the server, then the server may determine that a media conversion is needed. In other embodiments, if the server cannot access the file myVideo5.ts or a file associated with myVideo5.ts, or both, stored on a disk drive in communication with the server then the server determines that a media conversion is needed.

A determination that a media conversion is needed may be based at least in part on a combination of two or more of a URI, path, filename, file extension, Internet content type, MIME-type, content-type, protocol, query, fragment, etc. specified in a request. In some embodiments, a determination that a media conversion is needed may be based at least in part on one or more of a filename, file extension, Internet content type, MIME-type, content-type, or protocol determined by a server receiving the request based at least in part on information contained in the request. For example, a server may access one or more data stores to determine that a media conversion is needed based at least in part on a received request. Numerous additional embodiments and implementations would be obvious to one of ordinary skill in the art.

Referring back to FIG. 6, after determining that a media conversion is needed 620, the method 600 proceeds to block 630. In block 630, a conversion format is determined. For example, web server 250 may determine a conversion format based at least in part on a request received from mobile phone 230 through network 210.

In determining a conversion format, a server receiving a request may parse or otherwise analyze the received request. For example, a server receiving a request may parse or otherwise analyze a URI of a received request. In one embodiment, a conversion format may be determined based on a path specified in the received request. At least a portion of a path specified in a request may be separated by a delimiter, such as a "/", "&", or ":". In such an embodiment, the path may be used to determine a conversion format. For example, referring to FIG. 2, if "/mediaFragment/2/MPEG2TS/" is a path specified in a request received by web server 250, then the web server 250 may determine that the conversion format is MPEG-2 because the path contains the word "MPEG2TS". In other words, a server may determine a conversion format based on at least a portion of the path specified in a request including the name of a format in which the requesting device wants to receive a response.

A conversion format may be determined based on a protocol specified in a path of a received request. For example, in one embodiment, a request contains a path "/HLS/mediaSegment/". In this embodiment, a server receiving the request may determine a conversion format because "HLS" in the path indicates that the client device wants to receive a response in a format compatible with HLS. Thus, in this embodiment, the server may determine that a conversion format should be MPEG-2 because such a format is compatible with HLS.

A conversion format may be determined based on a filename specified in a request. For example, a portion of a path specified in a URI in a request may be interpretable by a server receiving the request as a filename. As one example, if a server receives a request from a client device and the request contains information indicating that a file having the name "mediaSegment10HLS" should be sent to the client device, then the server may determine that a conversion format compatible with HLS should be used because the filename contains a protocol (i.e. HLS) for which a response should be compatible. In this embodiment, the server may determine that a MPEG-2 TS format should be used as the conversion format because a MPEG-2 TS format is compatible with HLS. In another embodiment, if a server receives a response from a client device and the request contains information that a file having the name "mediaSegment4MPEG2", then the server may determine that a MPEG-2 format should be used for the conversion format because the filename indicates the format that should be used.

A conversion format may be based on a file extension specified in a request. For example, a portion of a path specified in a URI of a request may be interpretable by a server receiving the request as a file extension. In one embodiment, if a request containing the path "folder1/fileNameNumX.ts" is received by a server from a client device, then the server may be able to parse or otherwise analyze the path specified in the request to determine that the client device that sent the request wants to receive a response in a MPEG-2 TS format. In this embodiment, the server may determine a conversion format based on the ".ts" file extension specified in the path or filename, or both, of the request.

A conversion format may be based on a query or fragment, or both, specified in a request. For example, a query or a fragment, or both, specified in a URI in a request may be interpretable by a server receiving the request to determine a conversion format. For example, if a request contains a query with the text "conversionFormat=AVI", then a server receiving the request may determine that a conversion format for the request should be in a AVI format. In one embodiment, a query or fragment, or both, received in a request is used to specify a protocol that the server can use to determine a conversion format. For example, a query or fragment, or both, in a received request may contain the text "protocol=HLS" which the server uses to determine a conversion format. Thus, in this embodiment, the server receiving the request may determine that a response should be in a format compatible with HLS. For example, the server may determine that a MPEG-2 TS format should be used because the MPEG-2 TS format is compatible with HLS protocol. In another embodiment, a query or fragment, or both, received in a request may be used to determine an Internet media type, MIME type, and/or a content-type which indicates a conversion format. In this embodiment, the server receiving the request may determine a conversion format based on the determined Internet media type, MIME type, and/or content-type. For example, a query or a fragment received in a request may contain the text "mimeType=video/MP2T" which the server uses to determine that a response should be in a MPEG-2 TS format.

A conversion format may be determined based at least in part on a combination of two or more of a URI, path, filename, file extension, Internet content type, MIME type, content-type, protocol, query, fragment, etc. specified in a request. In some embodiments, a conversion format may be determined based at least in part on one or more of a filename, file extension, Internet content type, MIME-type, content-type, or protocol determined by a server receiving the request based at least in part on information contained in the request. For example, a server may access one or more data stores to determine a conversion format based at least in part on a received request. Numerous additional embodiments and implementations would be obvious to one of ordinary skill in the art.

Referring back to FIG. 6, after determining a conversion format 630, the method 600 proceeds to block 640. In block 640, a media asset is determined based at least in part on the received request. For example, web server 250 may determine a media asset based at least in part on a request received from tablet computer 220 through network 210.

A media asset can be associated with media content. For example, in one embodiment, a media asset refers to a particular movie. In other embodiments, a media asset may be associated with a video, a television show, a video clip, a song, a piece of music, a live video broadcast, a live audio broadcast, a live video and audio broadcast, an audio stream, a video stream, an audio and video stream, or other media content. In one embodiment, a media asset is associated with live media content. In another embodiment, a media asset is associated with video on demand (VOD). In other embodiments, a media asset may be associated with audio and video on demand (A VOD). In one embodiment, a media asset is associated with a live event. In this embodiment, as the live event takes place, one or more media segments or media fragments, or both, associated with the media asset may be added to the media asset. For example, a media asset may be associated with more media segments or media fragments, or both, ten minutes into a live event than five minutes into the live event. In this embodiment, the current time or the total duration, or both, for the media asset may change as the live event takes place.

A media asset may be associated with any number of files. For example, FIG. 5 illustrates a media asset 500 according to an embodiment. In the embodiment shown in FIG. 5, the media asset 500 has three media segments 510-530. A media segment may contain media data related to the media asset. For example, media segment 510 may contain seconds 0 to 10 of a video associated with media asset 500. In some embodiments, a media segment may contain additional information related to a media asset such as metadata. Media segments associated with a media asset may have equal or varying durations. For example, in one embodiment, media segments 510, 520, and 530 each have a duration of 10 seconds. In this embodiment, the media asset 500 may be associated with a video clip with a total time or a total duration of 30 seconds. In another embodiment, media segment 510 has a duration of 10 seconds, media segment 520 has a duration of 20 seconds, and media segment 530 has a duration of 5.5 seconds.

In one embodiment, a media segment is associated with one or more fragments. For example, in FIG. 5, each media segment 510-520 is divided into one or more media fragments 540-580. As shown in FIG. 5, media segment 510 contains four media fragments 540-555, media segment 520 contains four media fragments 560-575, and media segment 530 contains one media fragment 580. A media fragment may contain media data related to a media asset. For example, media fragment 540 may contain seconds 0 to 2 of media segment 510 which contains seconds 0 to 10 of a movie associated with media asset 500. In some embodiments, a media fragment may contain additional information related to a media asset or a media segment, or both, such as metadata. Media fragments associated with a media segment or a media asset, or both, may have equal or varying durations. For example, in one embodiment, media fragments 540-555 each have a duration of 5 seconds. In this embodiment, media segment 510 may be associated with a piece of media content for the media asset 500 having a duration of 20 seconds. In another embodiment, media fragment 540 has a duration of 10 seconds, media fragment 545 has a duration of 2 seconds, media fragment 550 has a duration of 20 seconds, and media fragment 555 has a duration of 1 second.

A media asset may be associated with one or more files that provide information related to media segments or media fragments, or both, that are associated with the media asset. For example, a media asset may be associated with an index file related to a media asset. In one embodiment, an index file for a media asset provides information such as a duration for the media asset. In another embodiment, an index file for a media asset provides a list of media segments or media fragments, or both, associated with the media asset. For example, referring to FIG. 5, an index file for media asset 500 may provide that each media segment 510-530 has a duration of 10 seconds and the overall duration of the media asset 500 is 30 seconds. In this embodiment, the index file may contain information, such as URIs or offsets, that enables a server to obtain one or more media segments or media fragments. For example, referring still to FIG. 5, an index file for media asset 500 may contain a link to media segment 510 as well as links to media fragments 540-555. In another embodiment, an index file for a media asset provides offsets that can be used to identify one or more media segments or media fragments, or both, associated with a media asset. For example, referring to FIG. 5, an index file for media asset 500 may provide offsets that can be used to identify or obtain, or both, one or more media segments or media fragments, or both. In one embodiment, an index file provides metadata associated with a media asset.

In one embodiment, a media asset may be associated with one or more files that provide bootstrap information related to the media asset. Bootstrap information can include information needed by a server to generate a playlist such as a start time and a total time for a media asset. Bootstrap information may include a current time or a current duration, or both, for a media asset. In various embodiments, bootstrap information may be contained in one or more media segments for a media asset, in one or more media fragments for a media asset, in one or more indexes for a media asset, or in one or more separate files associated with a media asset. In one embodiment, bootstrap information comprises a run table that stores a sequence of elements that are expected to have the same duration. For example, a single record in a fragment run table may represent a series of fragments having the same duration. Bootstrap information may include a list of web servers where data associated with a media asset is stored. For example, if a media segment is known to be stored on two servers, then bootstrap information may include a URI for each server storing the media segment. In some embodiments, one or more files containing bootstrap information also contains metadata related to a media asset. In various embodiments, bootstrap information may include information about one or more servers, media segments, or media fragments related to a media asset. In some embodiments, bootstrap information may include durations, start times, end times, etc. related to a media asset, one or more media segments related to the media asset, one or more media fragments related to the media asset, or a combination thereof.

Referring back to FIG. 6, in determining a media asset associated with a request, a server receiving a request may parse or otherwise analyze the received request. For example, a server receiving a request may parse or otherwise analyze a URI of a received request. In one embodiment, a media asset may be determined based on a path specified in the received request. For example, in an embodiment, at least a portion of a path specified in a request is separated by a delimiter, such as a "/", "&", or ":". In such an embodiment, the path may be used to specify a media asset. For example, referring to FIG. 2, if "/baseballGame/1234/" is a path specified in a request received by web server 250, then the web server 250 may determine that the request is associated with a media asset entitled "baseballGame". In another embodiment, if a request includes a path "/video2/", then a server receiving the request may determine that the request is associated with a media asset entitled "video2" as specified in the path.

A media asset may be determined based on a filename specified in a request. For example, a portion of a path specified in a URI in a request may be interpretable by a server receiving the request as a filename. As one example, if a server receives a request from a client device and the request contains "/folder1/folder2/baseballGame.ts", then the server may determine that the request is associated with the filename "baseballGame.ts" and that the filename is associated with a media asset entitled "baseballGame". In another embodiment, if a server receives a request from a client device and the request contains information indicating that the request is associated with a file having the name "HLSvideoABC", then the server may determine that the request is associated with a media asset entitled "videoABC" based on a portion of the filename.

A media asset may be determined based on a query or a fragment, or both, specified in a request. For example, a query or fragment specified in a URI in a request may be interpretable by a server receiving the request to determine a media asset associated with the request. In one embodiment, a query containing the text "?mediaAsset=baseketball202" is received by a server and the server interprets the query to determine that a media asset entitled "basketball202" is associated with the request. In another embodiment, a request containing a query having the text "mediaId=10" is received by a server from a client device. In this embodiment, the server may determine that the request is associated with a media asset having an identification of "10". In addition, the server may access one or more data stores—such as a database containing media IDs referenced with media assets—to determine a media asset associated with the identification specified in the request. In other embodiments, the server may access one or more files that are used to determine a media asset associated with a received request.

Referring back to FIG. 6, after determining a media asset based at least in part on a received request 640, the method 600 proceeds to block 650. In block 650, at least a portion of at least one media file related to the media asset to convert into the conversion format is determined. For example, web server 250 may determine at least a portion of one or more media segments or media fragments, or both, related to the media asset to convert into the conversion format.

In one embodiment, information contained in the received request is used to determine at least a portion of one or more media files related to the media asset to convert into the conversion format. For example, a received request may contain a URI. In this embodiment, at least a portion of the URI may be used to determine at least a portion of one or more media files related to the media asset to convert into the conversion format. For example, a URI included in a received request may follow a naming scheme. In one embodiment, at least a portion of a URI may use the following scheme: "fileNameNumX.Extension". In this embodiment, the "NumX" portion of the URI refers to a sequence number. The sequence may be used by a server receiving a request to determine a time segment related to the media asset. For example, if a URI included in a request contains the text "myVideo2.ts", then a server receiving the request may interpret the "2" in the URI as corresponding with sequence number two. In this embodiment, the server recognizes a predetermined duration for each sequence number. For example, the server may identify that the duration of each sequence number is ten seconds. Thus, if the sequence number in a request is determined to be 2, then the server may determine that the request is associated with a time segment corresponding with seconds 20 to 30 of a media asset. In one embodiment, a received request may specify a start time and an end time that is used by the server to determine that the request corresponds with a time segment of a media asset. In other embodiments, a received request may specify a start time and a duration that is used by the server to determine that the request corresponds with a time segment of a media asset. In one embodiment, a received request may specify a start time and the server may determine a current time for a media asset. In this embodiment, the specified start time and the determined current time for the media asset is used by the sever to determine that the request corresponds with a time segment of a media asset. Numerous additional embodiments and implementations would be obvious to one of ordinary skill in the art.

In an embodiment, at least a portion of at least one media file related to the media asset to convert into the conversion format is based on information obtained in a received request. For example, if a server receives a request and determines that the request corresponds with seconds 10 to 40 of a media asset entitled "myVideo", then the server may determine one or more media files related to seconds 10 to 40 of "myVideo". The determined media files may be in a different format than the determined conversion format. A server receiving a request may access bootstrap information, one or more indexes, one or more media segments, one or more media fragments, additional information related to the media asset, or a combination thereof to determine at least a portion of at least one media file to convert into the conversion format. In one embodiment, a server receiving a request accesses one or more data stores to determine at least a portion of at least one media file related to the media asset to convert into the conversion format. Numerous additional embodiments and implementations would be obvious to one of ordinary skill in the art.

After determining at least a portion of at least one media file related to the media asset to convert into the conversion format 650, the method proceeds to block 660. In block 660, the at least a portion of the determined media file or media files are converted into one or more media files having the conversion format. For example, if a determined conversion format is MPEG-2 TS, then at least a portion of one or more media files related to the media asset that are in a different format may be converted into a single media file having an MPEG-2 TS format. In one embodiment, the determined conversion format is MPEG-2 TS and the determined at least one media file related to the media asset is one F4F fragment related to the media asset. In this embodiment, the F4F fragment may be converted into one media file having a MPEG-2 TS format. In another embodiment, the F4F fragment may be converted into two or more media files having a MPEG-2 TS. Each of the converted media files having a MPEG-2 TS may contain a portion of the media content associated with the F4F fragment. For example, an F4F fragment may be associated with media content having a duration of four seconds. In this embodiment, the F4F fragment may be converted into two MPEG-2 TS compatible media files each having a two second duration. The conversion of one or more media files into the conversion format may be performed in substantially real-time. In embodiments, the converted one or more media files may be stored on a disk drive. In other embodiments, the converted one or more media files may not be stored on a disk drive.

In one embodiment, the determined conversion format is MPEG-2 TS and the determined at least one media file related to the media asset is five F4F fragments related to the media asset. In this embodiment, the five F4F fragments may be converted into one media file having a MPEG-2 TS format. In another embodiment, the five F4F fragments may be converted into two or more media files having a MPEG-2 TS. Each of the converted media files having a MPEG-2 TS format may contain a portion of the media content associated with one or more of the F4F fragments. For example, each of the five F4F fragments may be associated with media content having a duration of four seconds (i.e. 20 second total duration). In one embodiment, each of the five F4F fragments are converted into a corresponding media file having a MPEG-2 TS format. In another embodiment, the first F4F fragment is converted into one media file having a MPEG-2 TS format and the remaining F4F fragments are converted into another media file having a MPEG-2 TS format. Numerous additional embodiments and implementations would be obvious to one of ordinary skill in the art.

After converting at least one media file into the conversion format 660, the method proceeds to block 670. In block 670, at least one of the converted media files is sent to the client device. For example, referring to FIG. 2, the web server 250 may send one or more converted files to the client device that submitted the request through network 210. After sending at least one of the converted media files to the client device, one or more of the converted media files may be deleted. In embodiments, one or more of the converted media files may never be stored on a disk drive.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
receiving a request from a client device that requests a playlist for accessing a media asset using a first media streaming communications protocol; and
in response to receiving the request:
identifying at least one media segment that corresponds to at least one time segment of the media asset, wherein the at least one media segment is identified from at least one file that is related to the media asset and that is used for providing access to the media asset via a second media streaming communications protocol different from the first media streaming communications protocol;
generating, by at least one processor, the playlist for accessing the media asset using the first media streaming communications protocol based on the at least one media segment identifying using identified from the at least one file for providing access to the media asset via the second media streaming communications protocol, wherein the generated playlist comprises at least one identifier usable to identify at least one media segment corresponding to the at least one time segment of the media asset; and
sending, by the at least one processor, the generated playlist to the client device.

2. The method of claim 1 wherein generating the playlist comprises:
determining that generation of the playlist is required based at least in part on the request;
identifying the first media streaming communications protocol based at least in part on the request; and
identifying the media asset based at least in part on the request.

3. The method of claim 2 wherein the first media streaming communications protocol comprises an HTTP Live Streaming (HLS) protocol and the second media streaming communications protocol comprises an HTTP Dynamic Streaming (HDS) protocol.

4. The method of claim 1 wherein the at least one identifier comprises at least one Uniform Resource Identifier (URI).

5. The method of claim 1, wherein identifying the at least one media segment that corresponds to the at least one time segment of the media asset comprises:
obtaining bootstrap information for the media asset from the at least one file, wherein the bootstrap information references a plurality of media segments for the media asset, each of the plurality of media segments corresponding with a respective portion of the media asset.

6. The method of claim 1 wherein identifying the at least one media segment that corresponds to the at least one time segment of the media asset comprises:
accessing an index for the media asset from the at least one file, wherein the index includes references to a plurality of media segments for the media asset, each of the plurality of media segments corresponding with a respective portion of the media asset.

7. The method of claim 1 wherein the media asset comprises at least one of a video on demand (VOD), an audio and video on demand (AVOD), a live video stream, and a live video and audio stream.

8. The method of claim 1 wherein the request is received over Hypertext Transfer Protocol (HTTP) and the generated playlist is sent to the client device over HTTP.

9. A method comprising:
receiving a request from a client device for a media segment in a first format compatible with a first media streaming communications protocol; and
in response to receiving the request:
identifying, by at least one processor, at least one media fragment having a second format based on the at least one media fragment corresponding to a time segment of a media asset associated with the requested media segment, the second format different than the first format and compatible with a second media streaming communications protocol different than the first media streaming communications protocol;

converting, by the at least one processor, at least a portion of the at least one media fragment into at least one media segment in the first format; and sending, by the at least one processor, at least a portion of the at least one converted media segment in the first format to the client device.

10. The method of claim 9 wherein the request comprises a Uniform Resource Identifier (URI) and determining the at least one media fragment comprises:

identifying the first format based at least in part on the URI; and identifying the media asset based at least in part on the URI.

11. The method of claim 9, wherein the first format comprises a MPEG-2 Transport System (MPEG-2 TS) format.

12. The method of claim 9 wherein the first media streaming communications protocol comprises an HTTP Live Streaming (HLS) protocol and the second media streaming communications protocol comprises an HTTP Dynamic Streaming (HDS) protocol.

13. A system comprising:

a processor configured for executing instructions stored in computer-readable medium on one or more devices and configured to:

receive a request from a client device requesting a playlist for accessing a media asset using an HTTP Live Streaming (HLS) protocol; and in response to receiving the request:

generate the playlist for accessing the media asset using the HLS protocol by identifying at least one media segment that corresponds to at least one time segment of the media asset, wherein the at least one media segment is identified from at least one file that is related to the media asset and that is used for providing access to the media asset via an HTTP Dynamic Streaming (HDS) protocol, wherein the generated playlist comprises at least one identifier usable to identify at least one media segment corresponding to the at least one time segment of the media asset; and send the generated playlist to the client device.

14. The system of claim 13 wherein the processor is further configured to:

determine that a playlist needs to be generated based at least in part on the request by parsing a Uniform Resource Locator (URI) in the request to determine a file extension and using the file extension to determine that the playlist needs to be generated.

15. The system of claim 13 wherein the processor is further configured to determine the HLS protocol based on at least one of a path, a filename, a file extension, a query, and a fragment specified in the request.

16. The system of claim 13 wherein a format for the playlist for accessing the media asset using the HLS protocol comprises M3U8, wherein the media asset comprises a live event, wherein the processor is further configured to:

determine a start time and a current time for the live event by accessing an HDS bootstrap file corresponding with the live event; and determine a plurality of Uniform Resource Locators (URIs) for the playlist based on the determined start time and the determined current time, wherein each of the plurality of URIs corresponds with a different time segment of the live event.

17. The system of claim 16 wherein the HDS bootstrap file is updated as the live event occurs.

18. The system of claim 16 wherein each of the different time segments of the live event corresponds to an equal duration of the media asset.

19. A non-transitory computer-readable medium on which is encoded program code executable by a processor, the program code comprising:

program code for receiving a first request from a client device though a network via hypertext transfer protocol (HTTP); and program code for, in response to receiving the first request:

determining that the first request corresponds to an HTTP Live Stream (HLS) playlist related to a media asset;

determining information about the media asset based on at least one HTTP Dynamic Streaming (HDS) file corresponding to the media asset, wherein the determined information includes at least one time segment of the media asset;

generating the HLS playlist based at least in part on the determined information including the at least one time segment, the generated HLS playlist having a format compatible with HLS; and sending the generated HLS playlist to the client device through the network via HTTP.

20. The non-transitory computer-readable medium of claim 19, wherein the program code further comprises:

program code for receiving a second request from the client device through the network via HTTP; and program code for, in response to receiving the second request:

determining that the second request corresponds to an HLS media segment of the media asset, the HLS media segment associated with at least one additional time segment of the media asset;

determining that at least one HDS media file corresponds to the HLS media segment of the media asset, wherein the at least one HDS media file is associated with the at least one additional time segment of the media asset;

converting at least a portion of the at least one HDS media file into the HLS media segment, wherein the HLS media segment has a format compatible with HLS; and sending the HLS media segment to the client device through the network via HTTP.

21. A server capable of simultaneous HTTP Dynamic Streaming (HDS) and HTTP Live Streaming (HLS), the server comprising:

a non-transitory computer-readable medium;

a network communications interface;

a processor in communication with the network communications interface and the non-transitory computer-readable medium, wherein the processor is configured to:

store a plurality of HDS media files related to a media asset on the non-transitory computer-readable medium;

receive a first request through the network communications interface from a first client device for a first portion of the media asset using HDS;

in response to receiving the first request from the first client device for the first portion of the media asset using HDS, send at least a portion of at least one of the plurality of HDS media files related to the media asset to the first client device;

receive a second request through the network communications interface from a second client device for a second portion of the media asset using HLS; and in response to receiving the second request from the second client device for the second portion of the media asset using HLS:

convert at least a portion of at least one of the plurality of HDS media files related to the media asset into at least one HLS media segment; and send at least a portion of the at least one HLS media segment to the second client device.

22. The server of claim 21 wherein the processor is further configured to delete the at least one HLS media segment after sending at least a portion of the at least one HLS media segment to the second client device.

23. The server of claim 21 wherein the processor is further configured to simultaneously send at least a portion of at least one of the plurality of HDS media files to the first client device and send at least a portion of the at least one HLS media segment to the second client device.

24. The server of claim 21 wherein the processor is further configured to receive the plurality of HDS media files related to the media asset from an encoder through the network communications interface.

25. The server of claim 21 wherein the processor is further configured to:

receive media content related to the media asset from an audio-visual source; and encode the media content received from the audio-visual source into the plurality of HDS media files.

* * * * *